July 5, 1949.

R. O. BILL 2,475,443

SEMITRAILER WITH BODY ELEVATING
AND LOWERING MEANS
Filed May 17, 1948

INVENTOR
Robert O. Bill
BY
Philip A. Friedell
Attorney

Patented July 5, 1949

2,475,443

UNITED STATES PATENT OFFICE 2,475,443

SEMITRAILER WITH BODY ELEVATING AND LOWERING MEANS

Robert O. Bill, San Leandro, Calif.

Application May 17, 1948, Serial No. 27,394

8 Claims. (Cl. 280—43)

This invention relates to improvements in trailers, and particularly to semi-trailers which are equipped only with rear wheels and which are provided with a tongue or gooseneck at the forward end for support by the traction device, and is of particular interest in connection with the loading, unloading and movement of crops, produce and the like on farms and ranches, and is also applicable for use in connection with any freight movements, being convenient for loading and unloading, and for coupling to the tractor or tractive device.

The conventional semi-trailer has a bed which is fixed as to height and is equipped at the forward end with legs which fold under the bed when coupled to the tractor, and which are dropped and braced to support the forward end when the tractor is to be uncoupled. With my invention no front supporting legs are required, the entire bed being lowered to rest on the road or ground and the semi-trailer being uncoupled by raising the gooseneck after the semi-trailer has been lowered, and similarly, when the tractor is to be coupled, the gooseneck is first lowered for coupling, after which lift is applied to the bed to raise the rear end relative to the rear axle and to raise the forward end simultaneously for support by the gooseneck.

With my invention the semi-trailer can be drawn to the position where it is to be loaded or unloaded, and then uncoupled and lowered, making loading or unloading far simpler, easier and quicker, and in fact, reducing the number of workers by about one-half with approximately the same time required for loading or unloading, or reducing the time of unloading or loading by one-half with the same number of workers, because, with the conventional semi-trailer it is necessary to have usually one man on the semi-trailer to place and stack the material for each man bringing the material to the semi-trailer, while with my invention the worker bringing the material can walk directly onto the bed and place and stack the material. The same applies to unloading.

Furthermore, when the semi-trailer is coupled to the tractor, the bed can be raised or lowered to the most convenient position for loading or unloading, raised for loading from or onto a platform or into a warehouse.

The objects and advantages of the invention are as follows:

First, to provide a semi-trailer with means for raising or lowering the bed relative to a supporting surface at will.

Second, to provide a semi-trailer as outlined with hydraulic raising and lowering means for the rear end of the bed and for the gooseneck, for convenience in loading, unloading, and for uncoupling and coupling to the tractor.

Third, to provide hydraulically actuated coupling means for coupling and uncoupling the semi-trailer to or from the tractor.

Fourth, to provide a semi-trailer as outlined in which the rear end of the bed and the gooseneck can be individually controlled.

Fifth, to provide a semi-trailer as outlined which is relatively simple in construction and arrangement and relatively economical to manufacture.

In describing the invention reference will be had to the accompanying drawings in which.

Figure 1:
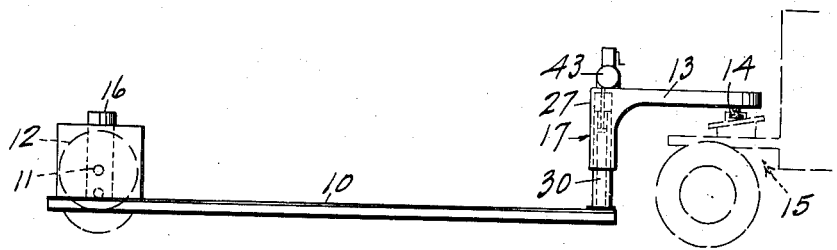
Fig. 1 is a side elevation of the invention.
Figure 2:
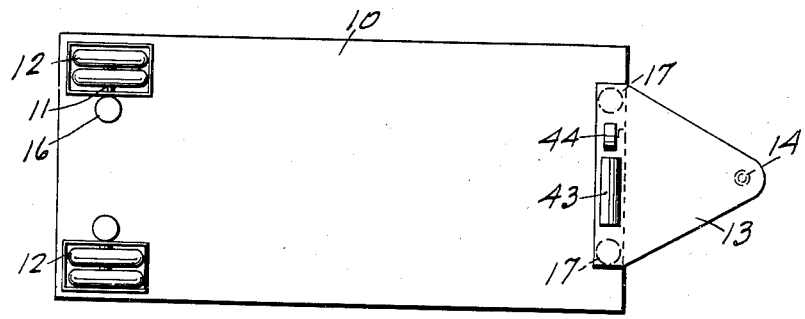
Fig. 2 is a top plan view of Fig. 1.

The invention can be applied to any type of semi-trailer, with body, or of the platform type shown and which consists of a platform or bed 10, a rear axle 11 and rear wheels 12, and a gooseneck 13 having pivotal coupling means 14 for coupling to a tractor 15.

Conventionally the bed is supported directly through springs on the axle, while in my invention the bed is supported through hydraulic lifts as indicated at 16 for the rear end and 17 for the forward end.

Figure 3:
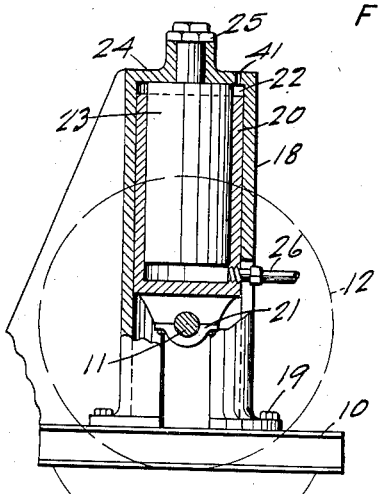
Fig. 3 is a side sectional elevation through one of the rear hydraulic lifts.

As illustrated in Fig. 3, the lifts for the rear end are illustrated as consisting of an outer sleeve 18 which is rigidly fixed at its lower end to the bed 10 as indicated at 19, and within which sleeve a cylinder 20 slidably operates. The lower end of this cylinder is attached to the axle 11 as indicated at 21, the upper end of the cylinder being open as indicated at 22.

Slidably operating within the cylinder is a plunger 23 and which has its upper end integral with or fixedly secured to the head 24 of the sleeve 18 as indicated at 25, and a conduit 26 connecting to the oil supply communicates with the lower end of the cylinder as shown.

Figure 4:
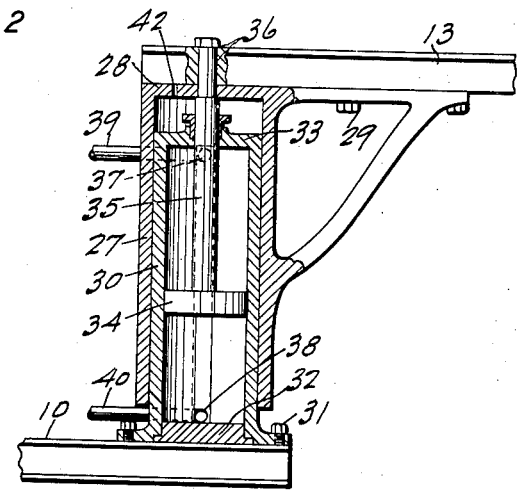
Fig. 4 is a side sectional elevation through one of the front hydraulic lifts.

As illustrated in Fig. 4, the hydraulic means for the forward end consists of two units, each consisting of an outer sleeve 27 the head 28 of which is integral with or fixedly secured to the coupling arm of the gooseneck 13, as indicated at 29 and this sleeve operates slidably over a cylinder 30 which has its lower end securely attached to the bed 10 as indicated at 31 and which cylinder is closed at both ends as indicated at 32 and 33. A piston 34 operates within the cylinder and has a piston rod 35 which operates through the upper head 33 and has its terminal end fixed in the head 28 of the sleeve, shown as also extending through the shoulder portion of the gooseneck, as indicated at 36. Ports 37 and 38 are provided at the respective ends of the cylinder and are connected through the conduits 39 and 40 with the fluid supply. Suitable breather passages 41 and 42 are formed through the heads 24 and 28.

The fluid supply consists of a supply tank 43, a pump 44, and a four-way valve 45, a conduit 46 from the tank to the intake of the pump, and a second connection 47 from the discharge of the pump to the four-way valve 45, and from the four-way valve to a connection 26 to the rear cylinders and 39 to the top of the front cylinders, a third connection 48 from the four-way valve to the bottom of the front cylinders, and a connection 49 from the four-way valve to the supply tank 43.

The operation of the invention is controlled by the single four-way valve in conjunction with any supply of fluid under pressure, and the pump 44 may be of any suitable type of hand pump or power pump. The hand pump is preferable because the trailer can be adjusted even when there is no source of power, and a gear pump appears to be the most suitable, to be operated by a hand crank.

Figure 5:
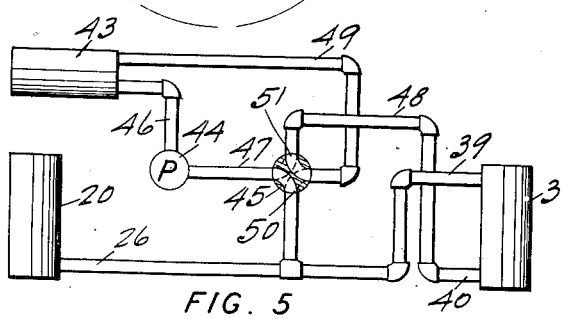
Fig. 5 is a diagrammatic view of the fluid supply system.

With the valve set as illustrated in Fig. 5, fluid is delivered through the valve passage 50 to the lower end of the rear cylinders and to the upper end of the front cylinders, forcing the rear pistons up and the sleeves 18 with them and thus raising the bed 10, the cylinders being supported on the axle. Simultaneously the fluid is delivered to the upper ends of the front cylinders forcing the pistons down until the coupling pin 14 engages in its socket in the tractor to support the gooseneck 13, after which the cylinders 30 are forced up, raising the bed at the front end, and simultaneously fluid from the lower ends of the front cylinders escapes through the outlet pipes 40, 48 to the valve passage 51 and thence through the pipe 49 to the supply tank. Thus the bed is raised, and the elevation is under constant control by the amount of fluid pumped, and is locked by closing the valve.

When the bed is to be lowered, the valve is turned to the dotted position for the valve passages. The fluid from the pump then passes through the pipe 48, 40 to the lower ends of the front cylinders allowing the cylinders to lower until they reach a resting point or support after which additional fluid raises the pistons and with it the gooseneck to uncouple the trailer from the tractor, and simultaneously the fluid from the rear cylinders and the tops of the front cylinders drains back through the pipes 26 and 39, through the valve and thence through pipe 49 to the supply tank.

If the gooseneck should settle because of long standing or movement of the valve, the valve is first moved to the dotted position to raise the gooseneck, then changed to the solid position to lower the gooseneck for coupling and for elevating the bed. Thus a single valve provides complete control for raising and lowering the bed and for coupling and uncoupling the trailer from the tractor.

I claim:

1. In a semi-trailer having a rear axle and rear wheels, and a gooseneck at the forward end, and a bed; hydraulic means cooperating between said rear axle and said bed and between said gooseneck and said bed, and control means therefor, for raising and lowering said bed, and for raising and lowering said gooseneck for coupling and uncoupling the semi-trailer to or from a tractor; said hydraulic means cooperating with said rear axle comprising a cylinder closed at the bottom and having its lower end supported on and affixed to the rear axle, a sleeve surrounding said cylinder and having its lower end attached to the rearward end of said bed, and having a head, and a plunger axially fixed in said head and operating within said cylinder, and a combination intake and discharge port for the lower end of said cylinder, and a passage formed upwardly from the lower end of said sleeve to clear said axle.

2. In a semi-trailer having a rear axle and rear wheels, and a gooseneck at the forward end, and a bed; hydraulic means cooperating between said rear axle and said bed and between said gooseneck and said bed, and control means therefor, for raising and lowering said bed, and for raising and lowering said gooseneck for coupling and uncoupling the semi-trailer to or from a tractor; said hydraulic means cooperating between said bed and said gooseneck comprising a sleeve open at the bottom and having a head and having the extending arm of said gooseneck fixed thereon, a cylinder within said sleeve and slidable therein and having a head at each end and with the lower end attached to said bed, and a piston operative within said cylinder and having a piston rod extending through the head at the upper end and anchored in the head of said sleeve, and a port for each end of said cylinder.

3. In a semi-trailer having a rear axle and rear wheels, and a gooseneck at the forward end, and a bed; hydraulic means cooperating between said rear axle and said bed and between said gooseneck and said bed, and control means therefor, for raising and lowering said bed, and for raising and lowering said gooseneck for coupling and uncoupling the semi-trailer to or from a tractor; said hydraulic means each including a piston, a cylinder and a sleeve, reciprocal one within the other, and with the sleeve attached to the bed and the cylinder attached to the rear axle, and the piston attached to the upper end of the sleeve for the rear end, and a port for the lower end of the cylinder; and with the cylinder attached to the bed, the sleeve attached to the gooseneck, and the piston attached to the head of the sleeve, and a port for each end of the cylinder, for the front end.

4. In a semi-trailer having a rear axle and rear wheels, and a gooseneck at the forward end, and a bed; hydraulic means cooperating between said rear axle and said bed and between said gooseneck and said bed, and control means therefor, for raising and lowering said bed, and for raising and lowering said gooseneck for coupling and uncoupling the semi-trailer to or from a tractor; said hydraulic means cooperating with said rear axle comprising a cylinder closed at the bottom and having its lower end supported on and affixed to the rear axle, a sleeve surrounding said cylinder and having its lower end attached to the rearward end of said bed, and having a head, and a plunger axially fixed in said head and operating within said cylinder, and a combination intake and discharge port for the lower end of said cylinder, and a passage formed upwardly from the lower end of said sleeve to clear said axle; said hydraulic means cooperating between said bed and said gooseneck comprising a sleeve open at the bottom and having a head and having the extending arm of said gooseneck fixed thereon, a cylinder within said sleeve and slidable therein and having a head at each end and with the lower end attached to said bed, and a piston operative within said cylinder and having a piston rod extending through the head at the upper end and anchored in the head of said sleeve, and a port for each end of said cylinder.

5. A semi-trailer having a gooseneck and a bed; two spaced hydraulic means each comprising a sleeve having a head and having the arm of said gooseneck fixed thereon; a cylinder slidable within said sleeve and having a head at each end and attached at its lower end to said bed, a piston operative within said cylinder and having a piston rod extending through the top head and secured in the head of said sleeve, and a port for each end of the cylinder, and a supply of fluid under pressure and control means for raising and lowering said gooseneck for coupling and uncoupling to or from a tractor when said bed is resting on a support and for raising and lowering said bed when said gooseneck is supported by a tractor, said combination of sleeve and cylinder providing a rigid sliding coupling between the gooseneck and the bed.

6. A semi-trailer having a bed, a rear axle and rear wheels, and a gooseneck, two cylinders having their lower end attached to and supported by said axle at spaced points, and each closed at the lower end, a sleeve slidable on each cylinder and having a head and having its lower end attached to the bed, and a plunger slidable in each cylinder and having its upper end fixed in said head, and a port and a supply of fluid and control means therefor for the lower end of said cylinder, for raising and lowering the rear end of said bed relative to said axle, at will.

7. A structure as defined in claim 6; said gooseneck comprising a coupling arm and two sleeves depending therefrom, a cylinder reciprocal in each sleeve and having a head at each end and having the lower end attached to said bed, a piston operative in each cylinder and having a piston rod extending through the upper head and fixed axially in the head for said sleeve, and a port for each end of each cylinder, and a supply of fluid and control means therefor, for raising and lowering said coupling arm at will for coupling to and uncoupling from a tractor when the bed is resting on a supporting surface, and for raising and lowering the front end of said bed when said coupling arm is supported by a tractor.

8. A semi-trailer having a bed, a rear axle and rear wheels, and a gooseneck, two cylinders having their lower end attached to and supported by said axle at spaced points, and each closed at the lower end, a sleeve slidable on each cylinder and having a head and having its lower end attached to the bed, and a plunger slidable in each cylinder and having its upper end fixed in said head, and a port and a supply of fluid and control means therefor for the lower end of said cylinder, for raising and lowering the rear end of said bed relative to said axle, at will; said gooseneck comprising a coupling arm and two sleeves depending therefrom, a cylinder reciprocal in each sleeve and having a head at each end and having the lower end attached to said bed, a piston operative in each cylinder and having a piston rod extending through the upper head and fixed axially in the head for said sleeve, and a port for each end of each cylinder, and a supply of fluid and control means therefor, for raising and lowering said coupling arm at will for coupling to and uncoupling from a tractor when the bed is resting on a supporting surface, and for raising and lowering the front end of said bed when said coupling arm is supported by a tractor; said control means comprising a supply tank, a pump, and a four-way valve for delivering fluid simultaneously to the lower ends of the rear cylinders and the upper ends of the front cylinders while draining from the lower ends of the front cylinders, when in one position; and for delivering to the lower ends of the front cylinders and draining from the upper ends of the front cylinders and the lower ends of the rear cylinders when in the other position, for the controls specified.

ROBERT O. BILL.

REFERENCES CITED

The following references are of record in the file of this patent:

UNITED STATES PATENTS

| Number | Name | Date |
| --- | --- | --- |
| 1,310,144 | Schneider | July 15, 1919 |
| 2,002,605 | Kincaid, Jr. | May 28, 1935 |
| 2,025,257 | Vaughn et al. | Dec. 24, 1935 |